United States Patent [19]

Wakamatsu et al.

[11] Patent Number: 6,001,293

[45] Date of Patent: Dec. 14, 1999

[54] PROCESS FOR PRODUCING POLYPROPYLENE LAMINATED FILM

[75] Inventors: Kazuki Wakamatsu, Sodegaura; Junichi Kimura, Toyonaka; Makoto Satoh; Yoichi Obata, both of Ichihara; Minoru Takane, Sodegaura, all of Japan

[73] Assignee: Sumitomo Chemical Co., Ltd., Osaka, Japan

[21] Appl. No.: 09/041,946

[22] Filed: Mar. 13, 1998

Related U.S. Application Data

[62] Division of application No. 08/361,311, Dec. 21, 1994, Pat. No. 5,773,129.

[30] Foreign Application Priority Data

Dec. 22, 1993 [JP] Japan .................................. 5-324535

[51] Int. Cl.$^6$ .................................................. B32B 27/32
[52] U.S. Cl. ................ 264/173.14; 264/173.15; 264/173.19; 156/229; 156/324; 526/348; 526/348.1
[58] Field of Search ......................... 264/171.28, 173.12, 264/173.14, 173.15, 173.9; 156/334, 229, 309.3, 324; 526/348.1, 348, 357

[56] References Cited

U.S. PATENT DOCUMENTS

| | | | |
|---|---|---|---|
| 4,675,247 | 6/1987 | Kitamura | 428/349 |
| 4,726,999 | 2/1988 | Kohyama et al. | 428/516 |
| 4,740,421 | 4/1988 | Suzuki | 428/349 |
| 5,336,746 | 8/1994 | Tsutusi et al. | 526/348.6 |
| 5,472,792 | 12/1995 | Tsurutani | 428/516 |
| 5,486,415 | 1/1996 | Kimura | 428/349 |
| 5,773,129 | 6/1998 | Wakamastu et al. | 428/213 |

FOREIGN PATENT DOCUMENTS

| | | |
|---|---|---|
| 01 146 968 | 7/1985 | European Pat. Off. . |
| 0 633 133 | 1/1995 | European Pat. Off. . |

*Primary Examiner*—D. S. Nakarani
*Assistant Examiner*—D. Lawrence Tarazano
*Attorney, Agent, or Firm*—Pillsbury Madison & Sutro LLP

[57] ABSTRACT

A polypropylene laminated film containing a crystalline polypropylene layer and, laminated on at least one side of the layer of the crystalline polypropylene, a layer of a copolymer of propylene and at least one α-olefin of from 4 to 10 carbon atoms having a specific composition, melt flow rate and molecular weight distribution in which the α-olefin content in the cold xylene soluble portion of the random copolymer is less than 1.7 times the α-olefin content in the copolymer and the random copolymer satisfies the mathematical expression, $$B \leq 1.05A - 10,$$

wherein A is a weight percentage of the content of said at least one α-olefin having from 4 to 10 carbon atoms in the random copolymer and B is a weight percentage of the cold xylene soluble portion in the random copolymer, is superior in low temperature heat sealability and hot tack property and moreover has a good transparency, blocking resistance and printability, wherein the random copolymer is obtained by gas phase polymerization substantially in the absence of a liquid medium, and using a catalyst system comprising (i) a solid catalyst component containing magnesium, titanium and a halogen as essential constituents, (ii) an organoaluminum compound and (iii) an electron donative compound.

7 Claims, No Drawings

PROCESS FOR PRODUCING POLYPROPYLENE LAMINATED FILM

This is a division of application Ser. No. 08/361,311, filed Dec. 21, 1994 now U.S. Pat. No. 5,773,129.

The present invention relates to a polypropylene laminated film which has a good low-temperature heat sealability and hot tack property and moreover has a good transparency, blocking resistance and printability; and a process for producing the same.

Biaxially oriented crystalline polypropylene film (abbreviated as BOPP) has been widely used as a packaging film by virtue of its good stiffness, transparency and moisture impermeability. However, BOPP itself is unsatisfactory in heat sealability. Therefore, there have hitherto been widely used laminated films obtained by laminating a resin having a good heat sealability (hereinafter heat sealing resin) on one or both surfaces of a BOPP or by co-extruding such a resin with a BOPP.

Of the properties required for the heat sealing resin, low-temperature heat sealability has been considered to be most important, and lowering the heat sealing temperature of the heat sealing resin has hitherto been of greatest concern in the art. This is because lowering the heat sealing temperature of the heat sealing resin permits speedup of the process of making bags of laminated film and improves the productivity. It is needless to say that such properties as transparency and blocking resistance of the sealing resin are also important.

In recent years, however, diversification of package types, diversification of articles to be packaged and attending diversification of packaging machines have been rapidly advancing. In the circumstances, the hot tack property, which has previously been not regarded as so important property of the heat sealing resin, has come to be of great concern as well as low-temperature heat sealability.

Various resins have hitherto been proposed as the heat sealing resin for BOPP. A widely known propylene-based heat sealing resin is a propylene-ethylene copolymer copolymerized with about 5% by weight of ethylene. This copolymer is superior in transparency and blocking resistance but is quite unsatisfactory in low-temperature heat sealability. Increasing the ethylene content of the propylene-ethylene copolymer for improving the low temperature heat sealability of the copolymer can improve the low-temperature heat sealability to a certain extent, but causes great deterioration of transparency and blocking resistance. Another widely known copolymer is propylene-butene-1 copolymer obtained by copolymerization of propylene and butene-1. For example, JP-A-50-128781 and JP-A-55-17542 disclose a propylene-butene-1 copolymer prepared by polymerization in an inert solvent (by the so-called slurry polymerization) and free from components soluble in the inert solvent. They teach that the copolymer has a good transparency and blocking resistance and fairly good low-temperature heat sealability. JP-A-56-22307 discloses a propylene-butene-1 copolymer having a specific sequence distribution prepared by polymerization in the absence of a liquid diluent using a catalyst system comprising a solid compound based on titanium trichloride and an organo-metallic compound. This copolymer, however, is unsatisfactory in low-temperature heat sealability and poor in blocking resistance, and further undergoes deterioration of transparency with the passage of time.

JP-A-60-16645 discloses a propylene-butene-1 copolymer obtained by gas phase polymerization substantially in the absence of a liquid medium, which copolymer is reported to show good results in all of the low temperature heat sealability, transparency and blocking resistance. According to the tracing experiment by the present inventors, however, the copolymer is unsatisfactory in the hot tack property.

Propylene-ethylene-butene-1 terpolymers obtained by copolymerizing propylene with ethylene and butene-1 are also well known as a heat sealing resin. For example, JP-A-54-26891 describes a process for producing olefin copolymers wherein propylene, 0.1–4% by weight of ethylene and 1–30% by weight of an α-olefin having 4–8 carbon atoms, respectively relative to propylene, are fed to the polymerization system. JP-A-53-26882 describes a propylene terpolymer which is characterized by having an ethylene content of 0.5–1.9% by weight and a butene-1 content of 0.5–4.9% by weight and having a substantially statistic comonomer distribution and a process for producing the terpolymer. JP-A-55-115416 describes that a soft or semirigid copolymer with low crystallinity can be obtained by copolymerizing propylene with 0.2–9% by mole of ethylene and 0.2–9% by mole of a linear α-olefin having 4 or more carbon atoms, respectively relative to propylene. However, none of these terpolymers are satisfactory in both of the low-temperature heat sealability and hot tack property and show a good transparency and blocking resistance.

The object of the present invention is to provide a polypropylene laminated film which has a good low-temperature heat sealability, hot tack property, transparency and blocking resistance.

The present inventors have made extensive study to attain the aforesaid object. As the result, it has been formed out that a polypropylene laminated film, on which a random copolymer of propylene with at least one α-olefin having from 4 to 10 carbon atoms which is obtained by a specific catalyst system and polymerization process and has a specific comonomer composition and molecular weight distribution, a specific cold xylene soluble and a specific cold xylene soluble composition is laminated as a heat sealing resin, has all of the aforesaid desirable properties. The present invention has been accomplished on the basis of the above finding.

According to the present invention, there are provided a polypropylene laminated film which comprises a layer of a crystalline polypropylene and a layer of a random copolymer of propylene and at least one α-olefin having from 4 to 10 carbon atoms formed on at least one side of the layer of the crystalline polypropylene, wherein the random copolymer is obtained by gas phase polymerization substantially in the absence of a liquid medium, and using a catalyst system comprising (i) a solid catalyst component containing magnesium, titanium and a halogen as essential constituents, (ii) an organoaluminum compound and (iii) an electron donative compound, the random copolymer having the following properties:

(1) the content of said at least one α-olefin having from 4 to 10 carbon atoms in the random copolymer falls within the range of from 15 to 30 percents by weight, (2) the melt flow rate of the random copolymer is not more than 20 g/10 minutes when determined at 230° C. under a load of 2.16 kg, (3) the molecular weight distribution, Mw/Mn, of the random copolymer is not more than 4.5, wherein Mw is weight average molecular weight of the random copolymer and Mn is number average molecular weight of the random copolymer, (4) the random copolymer satisfies the mathematical expression, $$B \leq 1.05A - 10,$$

wherein A is a weight percentage of the content of said at least one α-olefin having from 4 to 10 carbon atoms in the random copolymer and B is a weight percentage of the cold xylene soluble portion in the random copolymer, and (5) the content of said at least one α-olefin having from 4 to 10 carbon atoms in the cold xylene soluble portion of the copolymer is less than 1.7 times the content of said at least one α-olefin having from 4 ro 10 carbon atoms in the random copolymer; and a process for producing a polypropylene laminated film which comprises the steps of:

(a) copolymerizing propylene and at least one α-olefin having from 4 to 10 carbon atoms by gas phase polymerization substantially in the absence of a liquid medium, and using a catalyst system comprising (i) a solid catalyst component containing magnesium, titanium and a halogen as essential constituents, (ii) an organoaluminum compound and (iii) an electron donative compound, to obtain a random copolymer having the following properties:

(1) the content of said at least one α-olefin having from 4 to 10 carbon atoms in the random copolymer falls within the range of from 15 to 30 percents by weight, (2) the melt flow rate of the random copolymer is not more than 20 g/10 minutes when determined at 230° C. under a load of 2.16 kg, (3) the molecular weight distribution, Mw/Mn, of the random copolymer is not more than 4.5, wherein Mw is a weight average molecular weight of the random copolymer and Mn is a number average molecular weight of the random copolymer, (4) the random copolymer satisfies the mathematical expression, $$B \leq 1.05A - 10,$$

wherein A is a weight percentage of the content of said at least one α-olefin having from 4 to 10 carbon atoms in the random copolymer and B is a weight percentage of the cold xylene soluble portion in the random copolymer, and (5) the content of said at least one α-olefin having from 4 to 10 carbon atoms in the cold xylene soluble portion of the copolymer is less than 1.7 times the content of said at least one α-olefin having 4 or more carbon atoms in the random copolymer; and (b) making polypropylene laminated film comprising a layer of a crystalline polypropylene and a layer of the random copolymer obtained in step (a) formed on at least one side of the layer of the layer of the crystalline polypropylene.

The first outstanding feature of the laminated film obtained according to the present invention is that it is superior both in low-temperature heat sealability and in hot tack property. The second outstanding feature is that it has, in addition to good low-temperature heat sealability and hot tack property, good transparency, good blocking resistance and further good printability.

The random copolymers of propylene and at least one α-olefin having from 4 to 10 carbon atoms used as the heat sealing resin in the present invention is produced by the so-called gas phase polymerization. Slurry polymerization, a conventional polymerization method in which polymerization is carried out in an inert hydrocarbon, is not suitable for preparing the random copolymer which meets the objects of the present invention, because a large amount of the produced polymer dissolved in the inert hydrocarbon solvent notably disturbs the progress of the polymerization. Moreover, it is economically disadvantageous for its low polymer yield.

The gas phase polymerization may be conducted with a conventional fluid bed reactor, fluid bed reactor equipped with a stirrer, and the like. It is essential to carry out the polymerization under such temperature/pressure conditions that prevent the liquefaction of the monomer gases and the agglomeration of the polymer particles in the reactor. Particularly preferred polymerization conditions are: a temperature range of 50°–95° C. and a pressure range of 2–30 kg/cm² (gauge pressure, hereinafter abbreviated as G). A molecular weight controlling agent, such as hydrogen, is preferably added for the purpose of controlling the melt flowability of the polymer obtained. The gas phase polymerization may be conducted by any of batch polymerization, continuous polymerization, and the combination of the two. The monomers and the molecular weight controlling agent consumed in the course of the polymerization may be fed to the reactor either continuously or intermittently. The random copolymer used in the present invention may be washed after the gas phase polymerization with an alcohol, hydrocarbon solvent, or the like to remove the catalyst residue or to remove low molecular weight polymer.

The catalyst system employed for producing the random copolymer used as the heat sealing resin in the present invention is a catalyst for stereo-selective polymerization of α-olefins known to the art. It is a catalyst system comprising (A) a solid catalyst component containing magnesium, titanium and a halogen as essential constituents, (B) an organoaluminum compound and (C) an electron donative compound.

The solid catalyst component (A) contains titanium, magnesium and a halogen as essential constituents. It may generally be obtained by reducing a titanium compound with an organomagnesium compound to obtain a solid product, treating the solid product with an ester compound to obtain an ester-treated component, and treating the ester-treated component with titanium tetrachloride.

The titanium compound used is represented by the formula, $Ti(OR)_b X_{4-b}$, wherein R is a hydrocarbon group having 1–20 carbon atoms, X is a halogen atom and b is a number satisfying the inequality, $0 < b \leq 4$.

Specific examples of R are alkyl groups such as methyl, ethyl, propyl, isopropyl, butyl, isobutyl, amyl, isoamyl, hexyl, heptyl, octyl, decyl, dodecyl, etc.; aryl groups such as phenyl, cresyl, xylyl, naphthyl, etc.; cycloalkyl groups such as cyclohexyl, cyclopentyl, etc.; allyl groups such as propenyl, etc.; and aralkyl groups such as benzyl, etc.

The magnesium component used may be any type of organomagnesium compounds containing at least one magnesium-carbon bond in the molecule. Particularly preferred are Grignard compounds represented by the formula, RMgX, wherein R is a hydrocarbon group having 1–20 carbon atoms and X is a halogen, and magnesium compounds represented by the formula, $RR^1Mg$, wherein R and $R^1$ may be the same or different and are a hydrocarbon group having 1–20 carbon atoms, respectively.

Specific examples of the Grignard compound are methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, phenylmagnesium chloride, phenylmagnesium bromide, etc. Specific examples of the magnesium compound represented by the formula, $RR^1Mg$, are diethylmagnesium, dipropylmagnesium, diisopropylmagnesium, dibutylmagnesium, di-sec-butylmagnesium, di-tert-butylmagnesium, butyl-sec-butylmagnesium, diamylmagnesium, diphenylmagnesium, etc.

The organoaluminum compound (B) used in combination with the solid catalyst component (A) has at least one aluminum-carbon bond in the molecule.

Specific examples of such organoaluminum compounds are trialkylaluminums, such as triethylaluminum, triisobutylaluminum, trihexylaluminum, etc.; dialkylaluminum halides, such as diethylaluminum halides, diisobutylaluminum halides, etc.; mixtures of trialkylaluminums and dialkylaluminum halides; and alkylalumoxanes, such as tetraethyldialumoxane, tetrabutyldialumoxane, etc.

Among these organoaluminum compounds, trialkylaluminums, mixtures of trialkylaluminums and dialkylaluminum halides, and alkylalumoxanes are preferred, and triethylaluminum, triisobutylaluminum, the mixture of triethylaluminum and diethylaluminum chloride, and tetraethyldialumoxane are particularly preferred.

The amount of the organoaluminum compound used may be selected from as wide a range as 1–1,000 moles, but preferably a range of 5–600 moles, per mole of titanium atoms in the solid catalyst component.

The electron donative compound used is preferably a silicon compound (C) represented by the formula, $R_1R_2Si(OR_3)_2$, exemplified below.

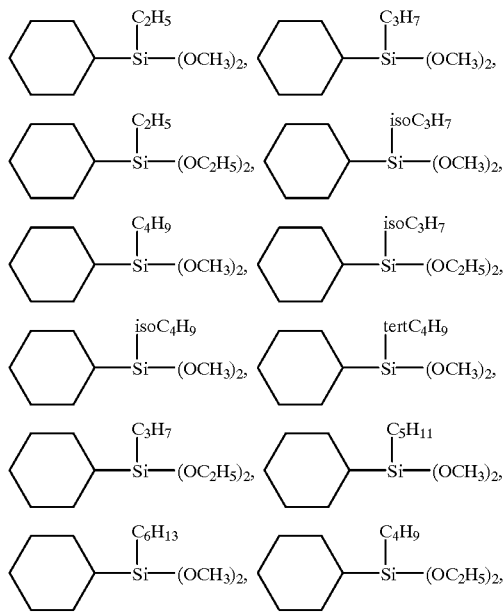

In the polymerization, the respective components of the catalyst system is used such that the molar ratio of the Al atom in the component (B) to the Ti atom in the component (A) falls within the range of from 1:1 to 1,000:1, preferably 5:1 to 600:1, and the molar ratio of the component (C) to the Al atom in the component (B) falls within the range of from 0.02:1 to 500:1, preferably 0.05:1 to 10:1. The polymerization is conducted by supplying propylene, at least one α-olefin and a molecular weight regulator (e.g. hydrogen) substantially in the absence of a solvent at a polymerization temperature of 20°–150° C., preferably 50°–95° C. and a polymerization pressure of atmospheric pressure to 40 kg/cm² G, preferably 2–30 kg/cm²G.

The random copolymer of propylene and at least one α-olefin having from 4 to 10 carbon atoms used as the heat sealing resin in the present invention contains a specific amount of said at least one α-olefin having from 4 to 10 carbon atoms. The α-olefin having from 4 to 10 carbon atoms includes a linear monoolefin such as butene-1, pentene-1, hexene-1, heptene-1, octene-1, decene-1, and the like, branched monoolefin such as 3-methylbutene-1, 3-methylpentene-1, 4-methylpentene-1, and the like. The content of said at least one α-olefin having from 4 to 10 carbon atoms in the random copolymer falls within the range of from 15 to 30% by weight, preferably 18 to 25% by weight. When the α-olefin content is less then 15% by weight, the effect of the copolymer in improving the low-temperature heat sealability and hot tack property of the laminated film is insufficient. To the contrary, when the α-olefin content is more than 30% by weight, the production of the random copolymer is unstabilized due to the deterioration of powder properties of the random copolymer during the gas phase polymerization.

The random copolymer of propylene and at least one α-olefin having from 4 to 10 carbon atoms used as the heat sealing resin in the present invention has a melt flow rate (hereinafter MFR) at 230° C. of preferably 20 g/10 min. or less, more preferably 3–15 g/10 min.

The MFR is a parameter which indicates the average molecular weight of a polymer. The larger the value of MFR of a polymer, the lower the average molecular weight of the polymer. When the MFR of the random copolymer is higher than 20 g/10 min., the effect of the copolymer in improving the hot tack property of the laminated film is sometimes insufficient. When the MFR of the random copolymer is excessively low, the effect of the copolymer in improving the low-temperature heat sealability of the laminated film is sometimes insufficient, and/or such problems as insufficient flowability of the copolymer sometimes occur in film formation.

The random copolymer of propylene and at least one α-olefin having from 4 to 10 carbon atoms used as the heat sealing resin in the present invention has a ratio of the weight average molecular weight to the number average molecular weight (Mw/Mn) of 4.5 or less, preferably 4.0 or less as determined by gel permeation chromatography (GPC). The Mw/Mn is a value which indicates the molecular weight distribution of a polymer. The smaller the value of Mw/Mn of a polymer, the narrower the molecular weight distribution of the polymer. Though the influence of the molecular weight distribution of a polymer on the heat seal properties, e.g., low-temperature heat sealability, hot tack property, etc., is not yet clear, it is considered that the low molecular weight component contained in a large amount in a polymer having a wide molecular weight distribution influences the heat seal properties in some way.

The α-olefin content and cold xylene soluble portion (CXS) of the random copolymer of propylene and at least one an α-olefin having from 4 to 10 carbon atoms used as the heat sealing resin in the present invention satisfy the following mathematical expression:

$$B \leq 1.05A - 10,$$

wherein A is the α-olefin content (% by weight) in the random copolymer and B is the cold xylene soluble portion (CXS, % by weight) in the random copolymer. When the cold xylene soluble portion and the content of at least one α-olefin having from 4 to 10 carbon atoms in the random copolymer do not satisfy the above mathematical expression, the effect of improving the hot tack property of the resulting laminated film by the random copolymer is insufficient, and the blocking resistance and printability of the laminated film are sometimes damaged.

The content of the α-olefin having from 4 to 10 carbon atoms in the cold xylene soluble portion of the random copolymer of propylene and at least one α-olefin having from 4 to 10 carbon atoms used as the heat sealing resin in the present invention is less than 1.7 times the content of the α-olefin having from 4 to 10 carbon atoms in the random copolymer. When the α-olefin content in the cold xylene soluble portion of the random copolymer is not less than 1.7 times the α-olefin content in the random copolymer, the effect of improving the hot tack property of the resulting laminated film is insufficient, and the printability of the laminated film is sometimes unsatisfactory.

Aftertreatment such as washing is not necessary for the random copolymer used as the heat sealing resin in the present invention obtained by gas phase polymerization; however, the random copolymer may be washed.

The copolymer used as the heat sealing resin in the present invention may be blended within the limits of about 20% by weight with rubber-like ethylene-α-olefin copolymers, butene-1 polymers including those of copolymer type, and the like, and may also be blended with a small amount of other polymeric substances.

Further, the copolymer may be incorporated with conventional additives, e.g., antistatic agents, antiblocking agents, lubricants, stabilizers, etc.

The polypropylene laminated film of the present invention can be obtained by laminating the aforesaid heat sealing resin on one side or on the both sides (one side and the opposite side) of crystalline polypropylene base film by conventional methods. Thus, the laminated film of the present invention can be obtained, for example, by (i) adhering a crystalline propylene film and a previously formed sheet of the heat sealing resin with an adhesive by passing them between pressure rollers, (ii) coating the heat sealing resin in the form of solution or dispersion in a solvent, such as toluene, etc., on a crystalline propylene base film to effect lamination, (iii) melt-extrusion coating the heat sealing resin on a crystalline propylene base film to effect lamination, or (iv) extruding the heat sealing resin and the crystalline propylene base polymer through separate extruders and then bonding them in or at the outlet of a common die while the two are still in a molten state.

The laminated film of the present invention is preferably uniaxially or biaxially stretched after the heat sealing resin has been laminated. Such polypropylene stretched laminated film may be produced by conventional methods. Such conventional methods include (i) preparing an unstretched laminated sheet by the so-called coextrusion, wherein the two kinds of sheets are combined in an extrusion die for forming the laminated sheet or in the neighborhood of its outlet while the two are still in a molten state, and biaxially stretching the laminated sheet, (ii) extrusion-laminating a heat sealing resin on a crystalline polypropylene base sheet, and biaxially stretching the laminated sheet, and (iii) uniaxially stretching a polypropylene base sheet in a heated condition in the machine direction (MD) through a group of rolls including a metallic roll, extrusion-laminating a heat sealing resin on the uniaxially stretched sheet, and stretching the extrusion-laminated sheet in the transversal direction (TD).

The lainated films are stretched in the MD in the temperature range of usually 120 to 160° C., preferably 130 to 150° C.

A magnification of the stretching in the MD falls within the range of usually from 3 to 8 times, preferably 4 to 6 times. A temperature of the stretching in the TD falls within the range of usually from 145 to 165° C., preferably 150 to 160° C. A magnification of the stretching in the TD falls within the range of usually from 4 to 10 times, preferably 5 to 9 times.

In the laminated film after stretching, the base layer of polypropylene usually has a thickness of from 10 $\mu$m to 100 $\mu$m, and the layer of the random copolymer has a thickness of from 0.1 $\mu$m to 10 $\mu$m.

The polypropylene laminated film can be produced at low cost, and the thus produced film is superior in both low-temperature heat sealability and hot tack property, has a good transparency and blocking resistance and further a good printability. Thus, the film is of great practical value.

The present invention is described in more detail below with reference to Examples, which, however, in no way limit the present invention. The values of the respective items shown in Examples and Comparative Examples were determined in the following manner.

(1) α-Olefin (butene-1) content (% by weight)

This was determined by IR spectrometry from the following equation.

Butene-1 content (% by weight)=1.208 K', wherein K' is absorbance at 767 $cm^{-1}$.

(2) Weight average molecular weight/number average molecular weight (molecular weight distribution, Mw/Mn)

This was determined by gel permeation chromatography (GPC) under the following conditions. The calibration curve was prepared by using standard polystyrenes.

Apparatus: Type 150 CV, mfd. by Millipore Waters Co., Ltd.

Column: Shodex M/S 80

Measuring temperature: 145° C.

Solvent: o-Dichlorobenzene

Sample concentration: 5 mg/8 ml

When determination was made under the above conditions with Standard Reference Material 706 (a polystyrene having Mw/Mn of 2.1) of NBS (National Bureau of Standards), a value of molecular weight distribution (Mw/Mn) of 2.1 was obtained.

(3) Melt flow rate (MFR) (g/10 min.)

This was determined at 230° C. under a load of 2.16 kg according to JIS K 7210, condition 14.

(4) Low temperature heat sealability (heat sealable temperature) (° C.)

Two sheets of film were placed one upon the other so that the random copolymer-carrying surfaces face each other, and heat-sealed by pressing them with a heat sealer (mfd. by Toyo Seiki Seisaku-sho, Ltd.) heated to a predetermined temperature under a load of 2 $kg/cm^2G$ for 2 seconds. After standing overnight, the sealed sheets were peeled at 23° C. at a peeling rate of 200 mm/min. and a peeling angle of 180°. The temperature of the sealer at which the peeling resistance force reached 300 g/25 mm was taken as the heat sealing temperature.

(5) Hot tack property (g/25 mm)

Two sheets of laminated film were placed one upon the other so that the random copolymer-carrying surfaces face each other. The thus overlapped sheets were cut into 3 inches (76.2 mm) in width and 150 mm in length. Then, a plate load spring was bent by hand into U-shape, and an inner edge of one of the overlapped sheets was adhered to one of the outer edges of the bent plate load spring, and an inner edge of the other overlapped sheet was adhered to the other outer edge of the bent plate load spring. Then, the other end parts of the two sheets were heat-sealed by pressing with a heat sealer (mfd. by Tester Sangyo Co., Ltd.) and heated to a predetermined temperature under a load of 2 kg/cm$^2$G for 2 seconds. Then, a peeling force was applied to the heat sealed part by releasing the hand which was holding the load spring immediately before raising a heat seal bar. After removing the sample from the load spring, a length of a peeled part was measured. Hot tack strength was determined as a spring load at which the peeled length of the sealed part showed ⅛ inch (3.2 mm), with variation of the spring load within the range of from 53 g to 295 g.

REFERENTIAL EXAMPLE (a) Synthesis of organomagnesium compound

A 1-l flask equipped with a stirrer, reflux cooler, dropping funnel and thermometer was flushed with argon, and then 32.0 g of magnesium flakes for Grignard reagent was placed therein. In the dropping funnel were placed 120 g of butyl chloride and 500 ml of dibutyl ether. About 30 ml of the resulting mixture was added dropwise to the magnesium in the flask to initiate a reaction. After initiation of the reaction, the dropwise addition was further continued at 50° C. for 4 hours. After completion of the addition, the reaction was continued at 60° C. for further 1 hour. Thereafter the reaction liquid was cooled to room temperature, and the solid was removed by filtration.

The concentration of butylmagnesium chloride in dibutyl ether was determined by hydrolyzing the chloride with a 1-N sulfuric acid, followed by back titration with a 1-N aqueous sodium hydroxide solution using phenolphthalein as an indicator. The concentration was found to be 2.1 mol/l.

(b) Synthesis of solid product

A 500-ml flask equipped with a stirrer and dropping funnel was flushed with argon, and then 240 ml of hexane, 5.4 g (15.8 mmoles) of tetrabutoxytitanium and 61.4 g (295 mmoles) of tetraethoxysilane were placed therein to form a uniform solution. Then, 150 ml of the organomagnesium compound synthesized in (a) above was gradually added by drops from the dropping funnel in the course of 4 hours while keeping the temperature in the flask at 5° C. After completion of the addition, the reaction mixture was further stirred at room temperature for 1 hours, and then separated into solid and liquid. The solid was repeatedly washed 3 times with 240 ml of hexane, and dried under reduced pressure to obtain 45.0 g of a brown solid product. The solid product contained 1.7% by weight of titanium atoms, 33.8% by weight of ethoxy groups and 2.9% by weight of butoxy groups.

The solid product showed no obvious peak at all in its wide angle X-ray diffraction pattern obtained by using the Cu—Kα line and thus was of an amophous structure.

(c) Synthesis of ester-treated solid

A 100-ml flask was flushed with argon. Then, 6.5 g of the solid product synthesized in (b) above, 16.2 ml of toluene and 4.3 ml (16 mmoles) of diisobutyl phthalate were placed in the flask and allowed to react at 95° C. for 1 hour.

(d) Synthesis of solid catalyst (activation treatment)

After completion of the washing in (c) above, 16.2 ml of toluene, 0.36 ml (1.3 mmoles) of diisobutyl phthalate, 2.2 ml (13 mmoles) of dibutyl ether and 38.0 ml (346 mmoles) of titanium tetrachloride were added into the flask, and the resulting mixture was allowed to react at 95° C. for 3 hours. After completion of the reaction, the solid was separated from liquid at 95° C. and washed two times with 33 ml of toluene at the same temperature. The aforesaid treatment with a mixture of diisobutyl phthalate, butyl ether and titanium tetrachloride was repeated once more under the same conditions. Then the treated solid was washed 3 times with 33 ml of hexane to obtain 5.0 g of an ocherous solid catalyst.

The solid catalyst contained 2.1% by weight of titanium atoms, 19.9% by weight of magnesium atoms and 12.7% by weight of phthalic ester.

EXAMPLE 1

(a) Catalyst component

In a 250-l reactor equipped with a stirrer was placed 150 l of thoroughly purified hexane and the atmosphere in the system was thoroughly replaced with nitrogen. Then 3.2 moles of triethylaluminum (hereinafter abbreviated as TEA), 0.32 mole of cyclohexylethyldimethoxysilane (hereinafter abbreviated as CHEDMS) and 51.8 g, in terms of titanium atoms, of the solid catalyst obtained in the Referential Example described above were added to the system. Then 2.8 kg of propylene was continuously added over a period of 2 hours while keeping the temperature of the system at 25° C.

(b) Polymerization

Gas phase polymerization was carried out in a polymerization vessel having an inner volume of 1,000 l at a polymerization temperature of 65° C. and a polymerization pressure of 12.5 kg/cm$^2$G by continuously feeding propylene and butene-1, feeding the catalyst component prepared in (a) above so that the average residence time might be 6 hours, simultaneously supplying 39 mmoles/hour of TEA and 2.8 mmoles/hour of CHEDMS and the H$_2$ concentration might be 0.21% and the butene-1 concentration might be 22% in the polymerization vessel.

The copolymer thus obtained had a butene-1 content of 21.7% by weight (Table 1).

To 100 parts by weight of the copolymer were added 0.15 part by weight of calcium stearate, 0.1 part by weight of Sumilizer BHT and 0.05 part by weight of Irganox 1010 and mixed in a Henschel mixer. The resulting mixture was melt-extruded to obtain pellets.

(c) Lamination and stretching

The copolymer pellets obtained above were pressed into a sheet of 100 μm thickness. The thus obtained sheet was melt-bonded by means of pressing with a propylene homopolymer sheet (MFR=2.5) of 500 μm thickness which had been formed beforehand by pressing, to obtain a laminated sheet. A 90 mm×90 mm specimen was cut out from the laminated sheet obtained above and processed into a biaxially oriented film having a thickness of 24μ under the following conditions.

Stretching machine: a bench type biaxial stretching machine mfd. by Toyo Seiki

Temperature: 150° C.

Preheating time: 3 minutes

Draw ratio: 5×5 times

Stretching rate: 5 m/minute

The properties of the laminated stretched film thus obtained are shown in Table 2. The laminated stretched film was superior in both low-temperature heat sealability and hot tack property and also had good transparency, blocking resistance and printability.

EXAMPLE 2

The same polymerization procedure as in Example 1 was repeated except for changing the H$_2$ concentration in the polymerization vessel into 1.1%, to obtain a copolymer. The copolymer had a MFR of 14 g/10 min. and butene-1 content of 21.8% by weight (Table 1).

The copolymer was subjected to pelletizing, lamination and stretching under respectively the same conditions as in Example 1. The properties of the laminated stretched film thus obtained are shown in Table 2. The film showed a good low-temperature heat sealability and hot tack property.

EXAMPLES 3 AND 4

Copolymers were obtained under the same polymerization conditions as in Example 1 except for changing the $H_2$ concentration and the butene-1 concentration in the polymerization vessel into 0.36% and 23%, respectively (Example 3), and changing the $H_2$ concentration and the butene-1 concentration into 0.25% and 25%, respectively (Example 4). The resulting copolymers had a butene-1 content of 22.7% by weight and 24.9% by weight, respectively (Table 1).

The copolymers were subjected to pelletizing, lamination and stretching, respectively, under the same conditions as in Example 1. The properties of the laminated stretched films thus obtained are shown in Table 2. Both of the films showed a good low-temperature heat sealability and hot tack property.

COMPARATIVE EXAMPLES 1 AND 2

A propylene-butene-1 copolymer was obtained according to the method described in Example 1 of U.S. Pat. No. 4,675,247 except for changing the $H_2$ concentration and the butene-1 concentration in the polymerization vessel into 1.5% and 25%, respectively (Comparative Example 1), and changing the $H_2$ concentration and the butene-1 concentration into 1.6% and 28%, respectively (Comparative Example 2) (Table 1).

The copolymer was subjected to pelletizing, lamination and stretching under the same conditions as in Example 1 of the present specification. The properties of the laminated stretched film thus obtained are shown in Table 2. The laminated stretched film showed good low-temperature heat sealability but showed unsatisfactory hot tack property.

COMPARATIVED EXAMPLE 3

A copolymer was obtained under the same polymerization conditions as in Example 1 except for changing the $H_2$ concentration and the butene-1 concentration in the polymerization vessel into 3.2% and 21.5%, respectively. The copolymer thus obtained had a MFR of 28 g/10 min. and butene-1 content of 20.6% by weight (Table 1).

The copolymer was subjected to pelletizing, lamination and stretching under the same conditions as in Example 1. The prop-erties of the laminated stretched film thus obtained are shown in Table 2.

The laminated stretched film showed a good low-temperature heat sealability, but showed unsatisfactory hot tack property.

COMPARATIVE EXAMPLE 4

A copolymer was obtained under the same polymerization conditions as in Example 1 except for changing the $H_2$ concentration and the butene-1 concentration in the polymerization vessel into 0.25% and 12%, respectively (Table 1). The resulting copolymer had a butene-1 content of 12.0% by weight.

The copolymer was subjected to pelletizing, lamination and stretching under the same conditions as in Example 1. The properties of the laminated stretched film thus obtained are shown in Table 2.

The laminated stretched film was unsatisfactory in both low-temperature heat sealability and hot tack property.

TABLE 1

|  | Butene-1 content (A) (wt %) | Mw/Mn | MFR (g/10 min.) | CXS content (B) (wt %) | Butene-1 content (C) in CXS (wt %) | C/A |
| --- | --- | --- | --- | --- | --- | --- |
| Example 1 | 21.7 | 3.1 | 7.3 | 6.7 | 35.0 | 1.61 |
| Example 2 | 21.8 | 3.0 | 14.0 | 9.1 | 34.2 | 1.58 |
| Example 3 | 22.7 | 3.4 | 8.0 | 9.6 | 34.3 | 1.51 |
| Example 4 | 24.9 | 3.1 | 6.8 | 14.0 | 36.8 | 1.48 |
| Comparative Example 1 | 22.7 | 4.7 | 7.3 | 15.7 | 40.6 | 1.79 |
| Comparative Example 2 | 24.6 | 5.7 | 8.3 | 18.2 | 42.1 | 1.71 |
| Comparative Example 3 | 20.6 |  | 28.0 | 7.1 | 34.0 | 1.65 |
| Comparative Example 4 | 12.0 |  | 8.0 | 1.2 | 20.3 | 1.69 |

TABLE 2

|  | Heat sealable temp. | Hot tack strength (g/3 inches) | | | | | | | | |
| --- | --- | --- | --- | --- | --- | --- | --- | --- | --- | --- |
|  |  | 70° C. | 80 | 90 | 100 | 110 | 120 | 130 | 140 | 150 | 160 |
| Example 1 | 93 |  | 53> | 295< | 295< | 295< | 295< | 240 | 134 | 90 | 84 |
| Example 2 | 94 |  | 53> | 295< | 295< | 295< | 295< | 295< | 233 | 124 | 89 |
| Example 3 | 93 |  | 53> | 295< | 295< | 295< | 295< | 295< | 235 | 130 | 99 |
| Example 4 | 87 | 53> | 259 | 295< | 295< | 295< | 295< | 274 | 236 | 172 | 99 |
| Comparative Example 1 | 80 | 85 | 132 | 255 | 295< | 280 | 241 | 205 | 171 | 96 | 63 |

TABLE 2-continued

| | Heat sealable temp. | Hot tack strength (g/3 inches) | | | | | | | | |
|---|---|---|---|---|---|---|---|---|---|---|
| | | 70° C. | 80 | 90 | 100 | 110 | 120 | 130 | 140 | 150 | 160 |
| Comparative Example 2 | 79 | 115 | 236 | 254 | 227 | 156 | 177 | 190 | 152 | 116 | 65 |
| Comparative Example 3 | 102 | | 53> | 70 | 290 | 295< | 280 | 250 | 175 | 95 | |
| Comparative Example 4 | 129 | | | | 53> | 53> | 80 | 295< | 260 | 174 | 110 |

The wider the temperature range within which the hot tack strength is satisfactory high, the better hot tack property. As shown in Table 2, the films in all of Examples 1 to 4 show a hot tack strength of 285 g/3 inches or more within the temperature range of 90 to 120° C., which were better results than comparative examples.

According to the present invention, a polypropylene laminated film can be provided which is superior in low temperature heat sealability and hot tack property and moreover has a good transparency, blocking resistance and printability.

What is claimed is:

1. A process for producing a polypropylene laminated film, said process comprising:
   (a) copolymerizing propylene and at least one α-olefin having from 4 to 10 carbon atoms by gas phase polymerization while avoiding liquefaction of monomer gases to obtain a random copolymer, said copolymerizing being conducting with a catalyst system comprising (i) a solid catalyst component containing magnesium, titanium and a halogen as essential constituents, (ii) an organoaluminum compound and (iii) an electron donative compound, the random copolymer having the following properties:
      (1) said at least one α-olefin having from 4 to 10 carbon atoms is present in the random copolymer in a range of from 15 to 30 percent by weight,
      (2) the random copolymer has a melt flow rate, at 230° C. under a load of 2.16 kg, of not more than 20 g/10 minutes,
      (3) the random copolymer has a molecular weight distribution, Mw/Mn, of not more than 4.5, wherein Mw is a weight average molecular weight of the random copolymer and Mn is a number average molecular weight of the random copolymer,
      (4) the random copolymer satisfies the mathematical expression, $$B \leq 1.05A - 10,$$

wherein A is a weight percentage of a content of said at least one α-olefin having from 4 to 10 carbon atoms in the random copolymer and B is a weight percentage of a cold xylene soluble portion in the random copolymer, and
      (5) a content of said at least one α-olefin having from 4 to 10 carbon atoms in the cold xylene soluble portion of the random copolymer is less than 1.7 times the content of said at least one α-olefin having 4 or more carbon atoms in the random copolymer, and
   (b) making a polypropylene laminated film comprising a layer of a crystalline polypropylene and at least one layer of the random copolymer on at least one side of the layer of the crystalline polypropylene.

2. The process according to claim 1, further comprising stretching the polypropylene laminated film to form a stretched polypropylene laminated film.

3. The process according to claim 1, wherein the random copolymer is a copolymer of propylene and butene-1.

4. The process according to claim 2, wherein the layer of the random copolymer is formed on one side of the layer of the crystalline polypropylene.

5. The process according to claim 4, wherein the layer of the crystalline polypropylene in the stretched polypropylene laminated film has a thickness of from 10 μm to 100 μm and the layer of the random copolymer in the stretched polypropylene laminated film has a thickness of from 0.1 μm to 10 μm.

6. The process according to claim 2, wherein the layer of the crystalline polypropylene is sandwiched between the layer of the random copolymer and another layer of the random copolymer.

7. The process according to claim 6, wherein the layer of the crystalline polypropylene in the stretched polypropylene laminated film has a thickness of from 10 μm to 100 μm, and the layers of the random copolymer sandwiching the layer of the crystalline polypropylene in the stretched polypropylene laminated film each have a thickness of from 0.1 μm to 10 μm.

* * * * *